(12) United States Patent
Jung et al.

(10) Patent No.: US 8,627,236 B2
(45) Date of Patent: Jan. 7, 2014

(54) TERMINAL AND CONTROL METHOD THEREOF

(75) Inventors: Sungon Jung, Gyeonggi-Do (KR); Namsu Lee, Gyeonggi-Do (KR); Booil Park, Gyeonggi-Do (KR); Jeongmin Kwak, Gyeongbuk (KR)

(73) Assignee: LG Electronics Inc., Seoul (KR)

( * ) Notice: Subject to any disclaimer, the term of this patent is extended or adjusted under 35 U.S.C. 154(b) by 599 days.

(21) Appl. No.: 12/881,993

(22) Filed: Sep. 14, 2010

(65) Prior Publication Data

US 2011/0105192 A1 May 5, 2011

(30) Foreign Application Priority Data

Nov. 3, 2009 (KR) ........................ 10-2009-0105637

(51) Int. Cl.
*G06F 3/033* (2013.01)
*G06F 3/00* (2006.01)

(52) U.S. Cl.
USPC ........... 715/863; 712/702; 712/836; 712/849; 712/864

(58) Field of Classification Search
USPC ................................. 715/702, 836, 849, 864
See application file for complete search history.

(56) References Cited

U.S. PATENT DOCUMENTS

| | | | | |
|---|---|---|---|---|
| 2,304,434 A * | 12/1942 | Ayres | | 355/46 |
| 4,078,860 A * | 3/1978 | Globus et al. | | 352/69 |
| 5,515,486 A * | 5/1996 | Amro et al. | | 715/848 |
| 5,678,015 A * | 10/1997 | Goh | | 715/782 |
| 5,767,854 A * | 6/1998 | Anwar | | 715/848 |
| 5,898,435 A * | 4/1999 | Nagahara et al. | | 715/841 |
| 5,963,213 A * | 10/1999 | Guedalia et al. | | 345/427 |
| 5,995,110 A * | 11/1999 | Litwinowicz | | 715/848 |
| 6,028,584 A * | 2/2000 | Chiang et al. | | 345/628 |
| 6,069,606 A * | 5/2000 | Sciammarella et al. | | 345/660 |
| 6,144,501 A * | 11/2000 | Nalwa | | 359/725 |
| 6,184,884 B1 * | 2/2001 | Nagahara et al. | | 715/828 |
| 6,236,398 B1 * | 5/2001 | Kojima et al. | | 345/419 |
| 6,243,093 B1 * | 6/2001 | Czerwinski et al. | | 715/848 |
| 6,266,098 B1 * | 7/2001 | Cove et al. | | 348/563 |
| 6,285,365 B1 * | 9/2001 | Nalwa | | 715/835 |
| 6,335,737 B1 * | 1/2002 | Grossman et al. | | 715/719 |
| 6,337,683 B1 * | 1/2002 | Gilbert et al. | | 345/418 |
| 6,448,987 B1 * | 9/2002 | Easty et al. | | 715/834 |
| 6,466,237 B1 * | 10/2002 | Miyao et al. | | 715/838 |
| 6,505,194 B1 * | 1/2003 | Nikolovska et al. | | 707/768 |
| 6,590,586 B1 * | 7/2003 | Swenton-Wall et al. | | 715/730 |
| 6,654,019 B2 * | 11/2003 | Ripley et al. | | 345/474 |
| 6,774,914 B1 * | 8/2004 | Benayoun | | 345/650 |
| 6,880,132 B2 * | 4/2005 | Uemura | | 715/848 |
| 6,978,051 B2 * | 12/2005 | Edwards | | 382/284 |
| 7,091,998 B2 * | 8/2006 | Miller-Smith | | 715/810 |
| 7,317,473 B2 * | 1/2008 | Chen et al. | | 348/39 |
| 7,346,373 B2 * | 3/2008 | Kim | | 455/566 |
| 7,383,503 B2 * | 6/2008 | Banks | | 715/273 |
| 7,400,782 B2 * | 7/2008 | Zhou et al. | | 382/284 |
| 7,424,218 B2 * | 9/2008 | Baudisch et al. | | 396/322 |
| 7,426,467 B2 * | 9/2008 | Nashida et al. | | 704/275 |

(Continued)

*Primary Examiner* — Steven B Theriault
(74) *Attorney, Agent, or Firm* — Lee, Hong, Degerman, Kang & Waimey

(57) ABSTRACT

Disclosed is a mobile terminal and a control method thereof capable of displaying an image or data in a particular object shape. When an image list is displayed and then any one particular image of the list is selected, the selected image is converted into a particular preset object shape to be displayed if the selected image is a panorama-type image.

18 Claims, 16 Drawing Sheets

(56) References Cited

U.S. PATENT DOCUMENTS

| | | | |
|---|---|---|---|
| 7,437,005 B2 * | 10/2008 | Drucker et al. | 382/224 |
| 7,486,324 B2 * | 2/2009 | Driscoll, Jr. et al. | 348/335 |
| 7,503,014 B2 * | 3/2009 | Tojo et al. | 715/810 |
| 7,543,245 B2 * | 6/2009 | Irimajiri | 715/836 |
| 7,567,274 B2 * | 7/2009 | Ekpar | 348/211.9 |
| 7,590,995 B2 * | 9/2009 | Nakamura et al. | 725/52 |
| 7,675,514 B2 * | 3/2010 | Ni et al. | 345/419 |
| 7,681,150 B2 * | 3/2010 | Hsieh et al. | 715/854 |
| 7,710,423 B2 * | 5/2010 | Drucker et al. | 345/474 |
| 7,730,425 B2 * | 6/2010 | de los Reyes et al. | 715/835 |
| 7,761,813 B2 * | 7/2010 | Kim et al. | 715/836 |
| 7,797,641 B2 * | 9/2010 | Karukka et al. | 715/802 |
| 7,814,439 B2 * | 10/2010 | Fitzmaurice et al. | 715/856 |
| 7,898,529 B2 * | 3/2011 | Fitzmaurice et al. | 345/173 |
| 7,961,980 B2 * | 6/2011 | Shih | 382/285 |
| 7,966,575 B1 * | 6/2011 | Jetha et al. | 715/817 |
| 7,992,102 B1 * | 8/2011 | De Angelo | 715/834 |
| 8,028,250 B2 * | 9/2011 | Vronay et al. | 715/853 |
| 8,111,255 B2 * | 2/2012 | Park | 345/419 |
| 8,120,605 B2 * | 2/2012 | Lee et al. | 345/419 |
| 8,217,956 B1 * | 7/2012 | Jin | 345/585 |
| 8,223,127 B2 * | 7/2012 | Park et al. | 345/169 |
| 8,291,341 B2 * | 10/2012 | Tseng et al. | 715/786 |
| 8,325,187 B2 * | 12/2012 | Shenhav et al. | 345/427 |
| 8,370,770 B2 * | 2/2013 | Vance et al. | 715/834 |
| 8,375,334 B2 * | 2/2013 | Nakano et al. | 715/848 |
| 2001/0010546 A1 * | 8/2001 | Chen | 348/218 |
| 2001/0028369 A1 * | 10/2001 | Gallo et al. | 345/848 |
| 2002/0054114 A1 * | 5/2002 | Shuping et al. | 345/764 |
| 2002/0118890 A1 * | 8/2002 | Rondinelli | 382/276 |
| 2003/0063089 A1 * | 4/2003 | Chen et al. | 345/473 |
| 2003/0167466 A1 * | 9/2003 | Nakamura et al. | 725/39 |
| 2004/0100479 A1 * | 5/2004 | Nakano et al. | 345/700 |
| 2004/0155907 A1 * | 8/2004 | Yamaguchi et al. | 345/810 |
| 2004/0257384 A1 * | 12/2004 | Park et al. | 345/646 |
| 2005/0086612 A1 * | 4/2005 | Gettman et al. | 715/848 |
| 2005/0091596 A1 * | 4/2005 | Anthony et al. | 715/712 |
| 2005/0192924 A1 * | 9/2005 | Drucker et al. | 707/1 |
| 2005/0278656 A1 * | 12/2005 | Goldthwaite et al. | 715/810 |
| 2006/0004873 A1 * | 1/2006 | Wong et al. | 707/104.1 |
| 2006/0156228 A1 * | 7/2006 | Gallo et al. | 715/523 |
| 2006/0156246 A1 * | 7/2006 | Williams et al. | 715/764 |
| 2007/0011617 A1 * | 1/2007 | Akagawa et al. | 715/738 |
| 2007/0081796 A1 * | 4/2007 | Fredlund et al. | 386/125 |
| 2007/0083911 A1 * | 4/2007 | Madden et al. | 725/135 |
| 2007/0162853 A1 * | 7/2007 | Weber et al. | 715/719 |
| 2007/0269198 A1 * | 11/2007 | Park et al. | 396/322 |
| 2008/0033641 A1 * | 2/2008 | Medalia | 701/209 |
| 2008/0034326 A1 * | 2/2008 | Chiu et al. | 715/849 |
| 2008/0062141 A1 * | 3/2008 | Chandhri | 345/173 |
| 2008/0066016 A1 * | 3/2008 | Dowdy et al. | 715/854 |
| 2008/0074500 A1 * | 3/2008 | Chen et al. | 348/207.1 |
| 2008/0143709 A1 * | 6/2008 | Fassero et al. | 345/419 |
| 2008/0291201 A1 * | 11/2008 | Lafon | 345/427 |
| 2008/0292213 A1 * | 11/2008 | Chau | 382/294 |
| 2009/0119589 A1 * | 5/2009 | Rowell et al. | 715/716 |
| 2009/0138823 A1 * | 5/2009 | Bradea | 715/835 |
| 2009/0204920 A1 * | 8/2009 | Beverley et al. | 715/768 |
| 2010/0023895 A1 * | 1/2010 | Benko et al. | 715/863 |
| 2010/0054628 A1 * | 3/2010 | Levy et al. | 382/284 |
| 2010/0093400 A1 * | 4/2010 | Ju et al. | 455/566 |
| 2010/0111429 A1 * | 5/2010 | Wang et al. | 382/233 |
| 2010/0123737 A1 * | 5/2010 | Williamson et al. | 345/672 |
| 2010/0175026 A1 * | 7/2010 | Bortner et al. | 715/818 |
| 2011/0096089 A1 * | 4/2011 | Shenhav et al. | 345/619 |
| 2011/0099524 A1 * | 4/2011 | Jeong et al. | 715/843 |
| 2011/0105192 A1 * | 5/2011 | Jung et al. | 455/566 |

* cited by examiner (a)

(b)

(a)

(b)

<DISPLAY CLOCK INFORMATION>

<DISPLAY CLOCK INFORMATION>

<CALLER INFORMATION DISPLAYED
DURING VIDEO PHONE CONVERSATION>

< PANORAMA IMAGE CONSTRUCTED WITH USER MENUS >

TERMINAL AND CONTROL METHOD THEREOF

RELATED APPLICATION

Pursuant to 35 U.S.C. §119(a), this application claims the benefit of earlier filing date and right of priority to Korean Application No. 10-2009-0105637, filed on Nov. 3, 2009, the contents of which is incorporated by reference herein in its entirety.

BACKGROUND OF THE INVENTION

1. Field of the Invention

The present invention relates to a mobile terminal and a control method thereof capable of displaying an image or data in a particular object shape.

2. Description of the Related Art

Terminals can be classified into two types, such as a mobile terminal and a stationary terminal based on its mobility. Furthermore, the mobile terminal can be further classified into two types, such as a handheld terminal and a vehicle mount terminal based on whether or not it can be directly carried by a user.

As it becomes multifunctional, furthermore, such a terminal is allowed to capture still images or moving images, play music or video files, play games, receive broadcast and the like, so as to be implemented as an integrated multimedia player. For a functional support and enhancement of the terminal, it may be considered to improve a structural and/or software aspect of the terminal.

The mobile terminal can capture a panorama photo. The panorama photo is made to be longer in a horizontal or vertical direction than a normal photo, which contains more scenes or screens than the normal photo. The panorama photo may be accomplished by pasting several copies of partially-captured photos together to be longer in a horizontal or vertical direction without overlapping one another.

However, in case of displaying the panorama photo, it may be displayed to be longer in a horizontal or vertical direction like a flat sticker shape. Therefore, it has a problem in which a vertical width thereof becomes narrow according to the horizontal length, and a horizontal width thereof becomes narrow according to the vertical length. Furthermore, an entire image should be enlarged to find a user's desired portion on that image because the width of the image is narrow as described above, thereby causing a problem in which the panorama photo cannot be seen as a whole in case of enlarging a portion of the image.

SUMMARY OF THE INVENTION

The present invention is to provide a mobile terminal and a control method thereof capable of displaying an image or data in a particular object shape.

Furthermore, the present invention is to provide a mobile terminal and a control method thereof capable of displaying an image according to a capture angle.

Furthermore, the present invention is to provide a mobile terminal and a control method thereof capable of displaying an image according to a capture orientation.

Furthermore, the present invention is to provide a mobile terminal and a control method thereof capable of automatically rotating and displaying an image according to a particular preset condition.

Furthermore, the present invention is to provide a mobile terminal and a control method thereof capable of displaying other parties on a video call in a particular object shape.

In order to accomplish the foregoing object, the present invention may include a display unit, a touch pad configured to select an image displayed on the display unit, and a controller configured to determine the type of the selected image, and convert into a particular preset object shape to display the image if the image is a panorama-type image.

Furthermore, in order to accomplish the foregoing object, when an image list is displayed and then any one particular image of the list is selected, the present invention is provided to convert the selected image into a particular preset object shape and display the converted image if the selected image is a panorama-type image.

A mobile terminal associated with at least one embodiment of the present invention having the foregoing configuration can display a panorama-type image with a particular object shape, and rotate and display the image displayed with the object shape according to a particular preset condition.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, a mobile terminal associated with the present invention will be described in more detail with reference to the accompanying drawings. A suffix "module" or "unit" used for constituent elements disclosed in the following description is merely intended for easy description of the specification, and the suffix itself does not give any special meaning or function.

A mobile terminal disclosed herein may include a portable phone, a smart phone, a laptop computer, a digital broadcast terminal, a personal digital assistant (PDA), a portable multimedia player (PMP), a navigation device, and the like. However, it would be easily understood by those skilled in the art that a configuration according to the embodiments disclosed herein may be applicable to stationary terminals such as digital TVs, desktop computers, and the like, as well as mobile terminals.

Figure 1:
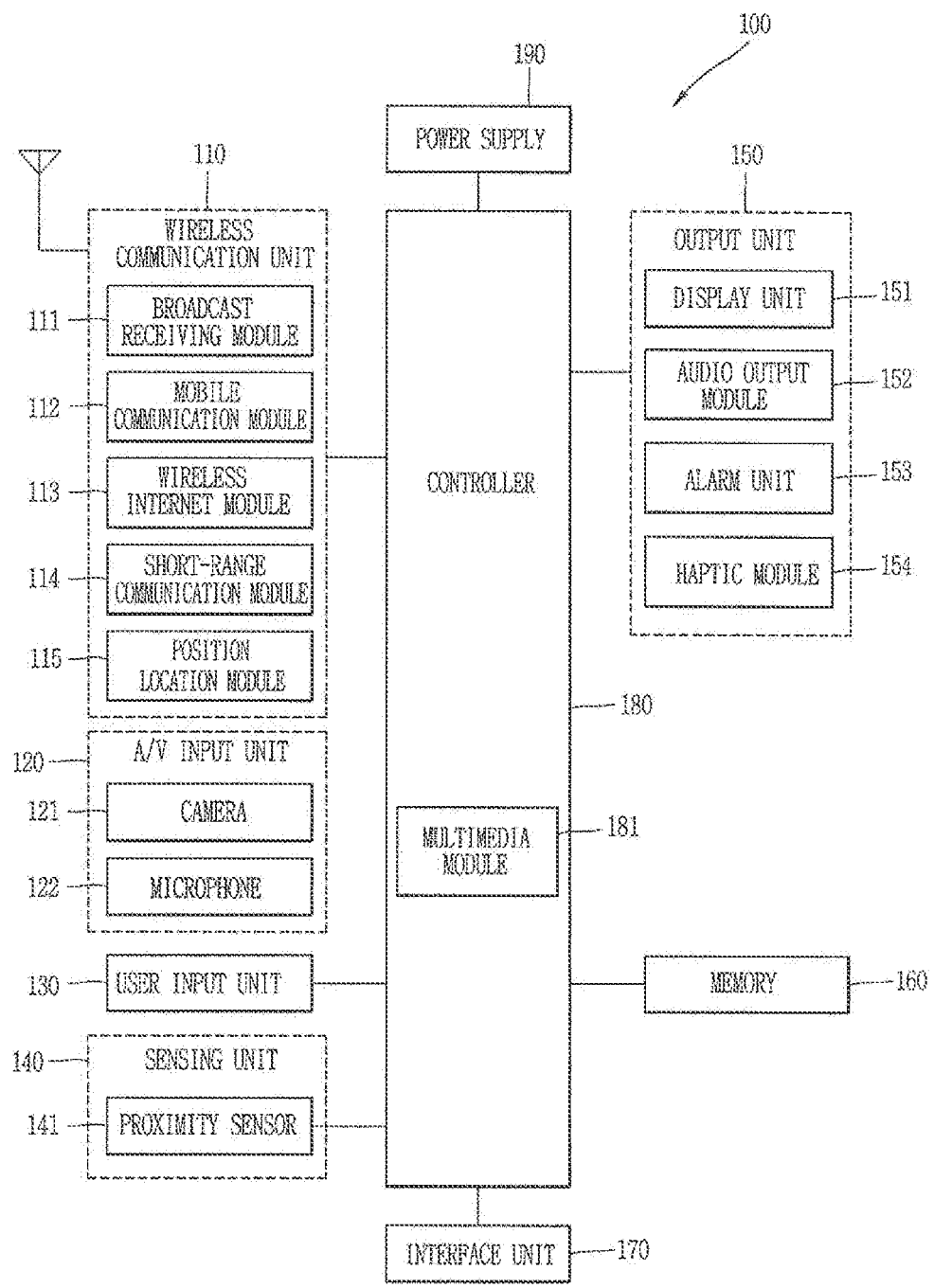
FIG. 1 is a block diagram illustrating a mobile terminal associated with an embodiment of the present invention.

FIG. 1 is a block diagram illustrating a mobile terminal associated with an embodiment of the present invention.

The mobile terminal 100 may include a wireless communication unit 110, an Audio/Video (NV) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile terminal may be implemented with greater or less number of elements than those illustrated elements.

Hereinafter, the constituent elements will be described in sequence.

The wireless communication unit 110 typically includes one or more modules allowing radio communication between the mobile terminal 100 and a wireless communication system, or allowing radio communication between radio communication the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is combined with the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113 means a module for supporting wireless Internet access. The wireless Internet module 113 may be built-in or externally installed to the mobile terminal 100. Here, it may be used a wireless Internet access technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 is a module for supporting a short-range communication. Here, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile terminal, and there is a GPS module as a representative example.

Referring to FIG. 1, the A/V (audio/video) input unit 120 receives an audio or video signal, and the NV (audio/video) input unit 120 may include a camera 121 and a microphone 122. The camera 121 processes a image frame, such as still picture or video, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed state of the mobile terminal 100, a location of the mobile terminal 100, an orientation of the mobile terminal 100, and the like, and generates a sensing signal for controlling the operation of the mobile terminal 100. For example, when the mobile terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170. On the other hand, the sensing unit 140 may include a proximity sensor 141.

The output unit 150 is configured to provide an output for audio signal, video signal, or alarm signal, and the output unit 150 may include the display unit 151, an audio output module 152, an alarm unit 153, a haptic module 154, and the like.

The display unit 151 may display(output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a terminal body through a region occupied by the display unit 151 of the terminal body.

The display unit 151 may be implemented in two or more in number according to a configured aspect of the portable terminal 100. For instance, a plurality of the display units 151 may be arranged on one surface to be spaced apart from or integrated with each other, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the portable terminal 100 covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as "proximity touch", whereas a status that the pointer substantially comes in contact with the touch screen will be referred to as "contact touch". For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the portable terminal 100, e.g., sound alarming a call received or a message received, and so on. The audio output module 152 may include a receiver, a speaker, a buzzer, and so on.

The alarm 153 outputs signals notifying occurrence of events from the portable terminal 100. The events occurring from the portable terminal 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the portable terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the portable terminal with external devices. The interface unit 170 may allow a data reception from an external device, a power delivery to each component in the portable terminal 100, or a data transmission from the portable terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the portable terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the portable terminal 100 via a port.

The interface unit may serve as a path for power to be supplied from an external cradle to the portable terminal 100 when the portable terminal 100 is connected to the external cradle or as a path for transferring various command signals inputted from the cradle by a user to the portable terminal 100. Such various command signals or power inputted from the cradle may operate as signals for recognizing that the portable terminal 100 has accurately been mounted to the cradle.

The controller 180 typically controls the overall operations of the portable terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For a software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2A:
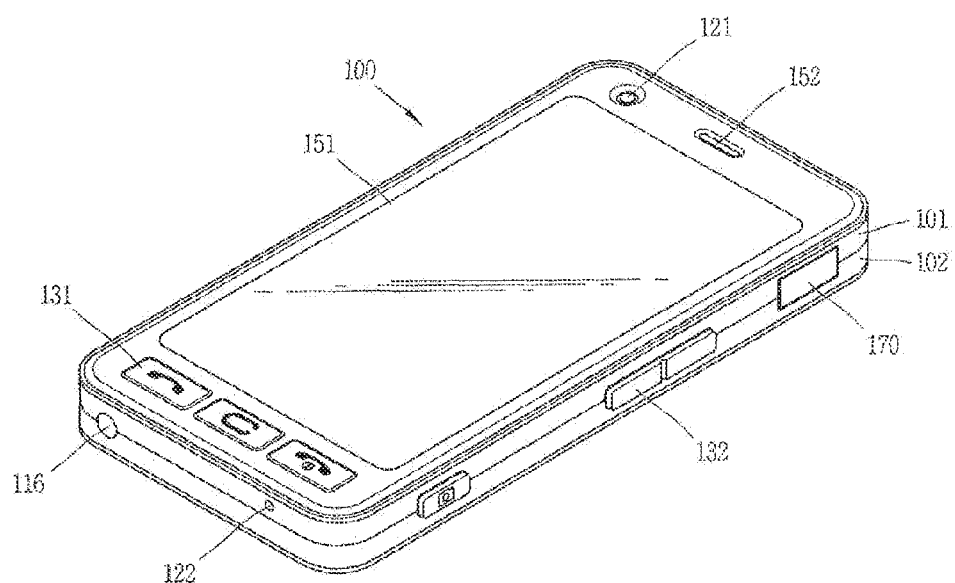
FIG. 2a is a front perspective view illustrating a portable terminal associated with an embodiment of the present invention.

FIG. 2a is a front perspective view illustrating an example of a mobile terminal or portable terminal associated with the present invention.

The portable terminal 100 disclosed herein is provided with a bar-type terminal body. However, the present invention is not only limited to this type of terminal, but also applicable to various structures of terminals such as slide type, folder type, swivel type, swing type, and the like, in which two and more bodies are combined with each other in a relatively movable manner.

The terminal body includes a case (casing, housing, cover, etc.) forming an appearance of the terminal. Various electronic components are built in a space formed between the front case 101 and the rear case 102. In this embodiment, the case may be divided into a front case 101 and a rear case 102. At least one middle case may be additionally disposed between the front case 101 and the rear case 102.

The cases may be formed by injection-molding a synthetic resin or may be also formed of a metal material such as stainless steel (STS), titanium (Ti), or the like.

A display unit 151, an audio output module 152, a camera 121, a user input unit 130/131, 132, a microphone 122, an interface 170, and the like may be arranged on the terminal body, mainly on the front case 101.

The display unit 151 occupies a most portion of the front case 101. The audio output unit 152 and the camera 121 are disposed on a region adjacent to one of both ends of the display unit 151, and the user input unit 131 and the microphone 122 are disposed on a region adjacent to the other end thereof. The user interface 132 and the interface 170, and the like, may be disposed on a lateral surface of the front case 101 and the rear case 102.

The user input unit 130 is manipulated to receive a command for controlling the operation of the portable terminal 100, and may include a plurality of manipulation units 131, 132. The manipulation units 131, 132 may be commonly designated as a manipulating portion, and any method may be employed if it is a tactile manner allowing the user to perform manipulation with a tactile feeling.

The content inputted by the manipulation units 131, 132 may be set in various ways. For example, the first manipulation unit 131 may be used to receive a command, such as start, end, scroll, 3D browser execution, or the like, and the second manipulation unit 132 may be used to receive a command, such as controlling a volume level being outputted from the audio output unit 152, or switching it into a touch recognition mode of the display unit 151.

Figure 2B:
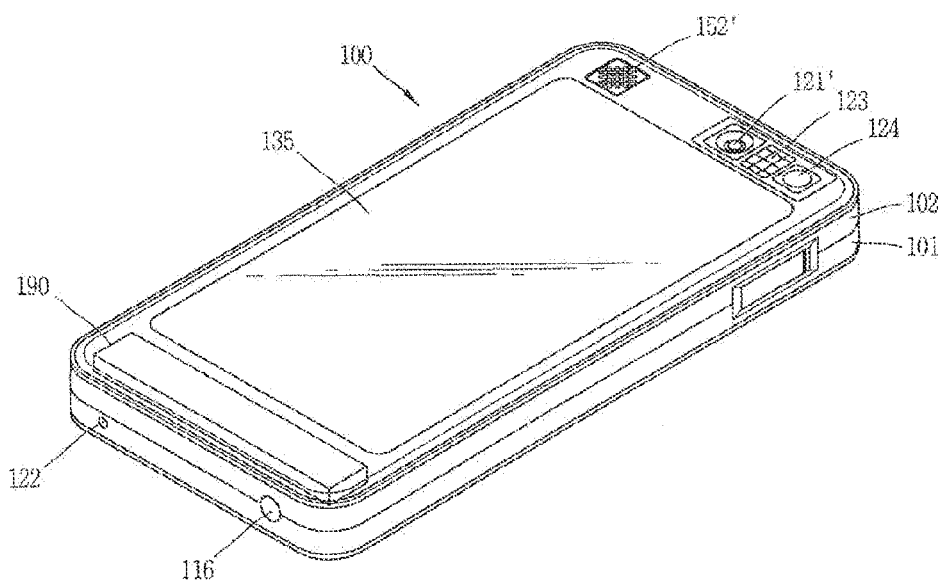
FIG. 2b is a rear perspective view illustrating a portable terminal associated with an embodiment of the present invention.

FIG. 2b is a rear perspective view illustrating a portable terminal of FIG. 2a.

Referring to FIG. 2b, a camera 121' may be additionally mounted on a rear surface of the terminal body, namely, the rear case 102. The camera 121' has an image capturing direction, which is substantially opposite to the direction of the camera 121 (refer to FIG. 2a), and may have different pixels from those of the first video input unit 121.

For example, it is preferable that the camera 121 has a relatively small number of pixels enough not to cause a difficulty when the user captures his or her own face and sends it to the other party during a video call or the like, and the camera 121' has a relatively large number of pixels since the user often captures a general object that is not sent immediately. The cameras 121, 121' may be provided in the terminal body in a rotatable and popupable manner.

Furthermore, a flash 123 and a mirror 124 may be additionally disposed adjacent to the camera 121'. The flash 123 illuminates light toward an object when capturing the object with the camera 121'. The mirror 124 allows the user to look at his or her own face, or the like, in a reflected way when capturing himself or herself (in a self-portrait mode) by using the camera 121'.

Furthermore, an audio output unit 152' may be additionally disposed on a rear surface of the terminal body. The audio output unit 152' together with the audio output unit 152 (refer to FIG. 2a) can implement a stereo function, and it may be also used to implement a speaker phone mode during a phone call.

Furthermore, an antenna 116 for receiving broadcast signals may be additionally disposed on a lateral surface of the terminal body. The antenna 116 constituting a broadcast receiving module 111 (refer to FIG. 1) may be provided so as to be pulled out from the terminal body.

Furthermore, a power supply unit 190 for supplying power to the portable terminal 100 may be mounted on a rear surface of the terminal body. The power supply unit 190 may be configured so as to be incorporated in the terminal body, or directly detachable from the outside of the terminal body.

A touch pad 135 for detecting a touch may be additionally mounted on the rear case 102. The touch pad 135 may be configured in an optical transmission type similarly to the display unit 151. In this case, if the display unit 151 is configured to output visual information from both sides of the display unit 151, then the visual information may be also recognized through the touch pad 135. The information being outputted from the both sides thereof may be controlled by the touch pad 135. In addition, a display may be additionally mounted on the touch pad 135, and a touch screen may be also disposed on the rear case 102.

The touch pad 135 operates in a reciprocal relation to the display unit 151 of the front case 101. The touch pad 135 may be disposed in parallel on a rear side of the display unit 151. The touch pad 135 may have the same or a smaller size as or than that of the display unit 151.

Various kinds of visual information may be displayed on the display unit 151. The visual information may be displayed in a form of characters, numerals, symbols, graphics, or icons. For an input of the visual information, at least one of the characters, numerals, symbols, graphics, or icons may be displayed with a predetermined arrangement so as to be implemented in a form of keypad. Such a keypad may be referred to as a so-called "soft key."

Hereinafter, preferred embodiments associated with a control method that can be implemented in a terminal having the foregoing configuration will be described with reference to the accompanying drawings. The following embodiments may be used alone or in combination with one another. Furthermore, the following embodiments may be used in combination with the foregoing user interface (UI).

Figure 3A:
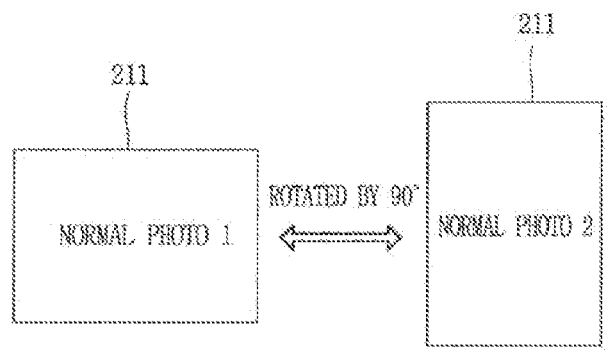
FIGS. 3a and 3b are illustrative views for explaining a difference between a normal photo and a panorama photo.
Figure 3B:
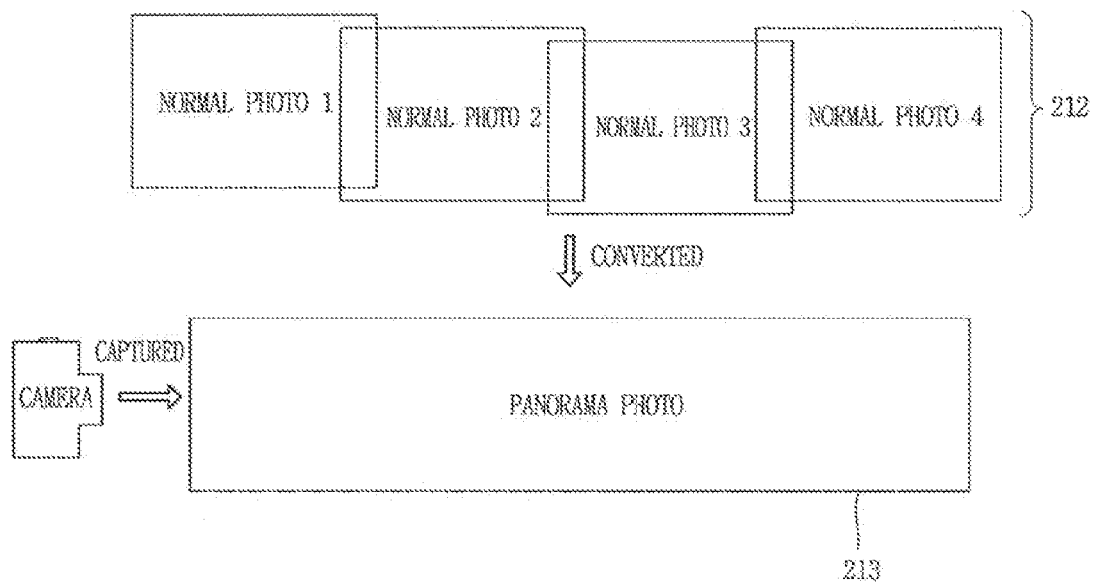

FIGS. 3a and 3b are illustrative views for explaining a difference between a normal photo and a panorama photo.

Typically, a lot of normal photos 211 have a rectangular form with a width-to-height ratio of about 4:3 such as the width-to-height length of 640*480 pixels, or a rectangular form with a width-to-height ratio of about 3:4 such as the width-to-height length of 480*640 pixels. Furthermore, a lot of panorama photos 213 have a form in which the length of either one side of the width and height is several times longer than the length of the other side.

The panorama photo is a photo that is captured while rotating a camera to the left or right by a desired angle at a state of being fixed to a certain axis. At this time, in typical cases, the rotating surface is a horizontal direction, but it does not make a difference even if the rotating surface is a vertical or oblique direction.

Furthermore, as illustrated in FIG. 3b, the panorama photo may be immediately captured by using a dedicated camera 214 but it may be also captured by using a general camera. In the latter case, several copies of photos 212 are continuously captured by rotating the camera such that some regions are duplicated (for example, 30%) and then the duplicated potions are connected with one another to be converted into a panorama form. In recent years, a lot of 360° or 180° panorama photos are also captured. The 360° panorama photo is a photo in which the capture starting and ending portions are made to be same.

Figure 4A:
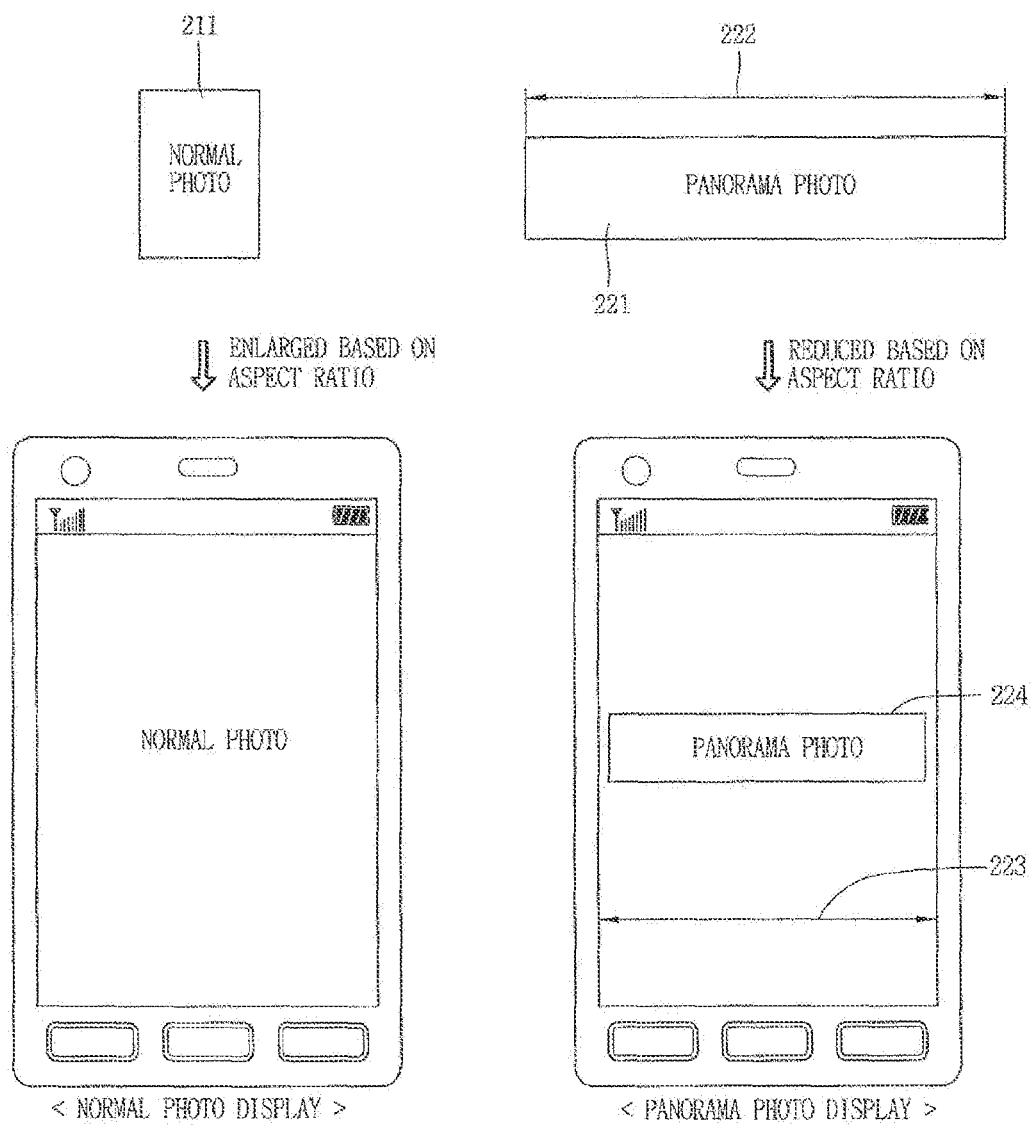
FIGS. 4a and 4b are illustrative views for explaining an advantage of an image display method associated with the present invention.
Figure 4B:
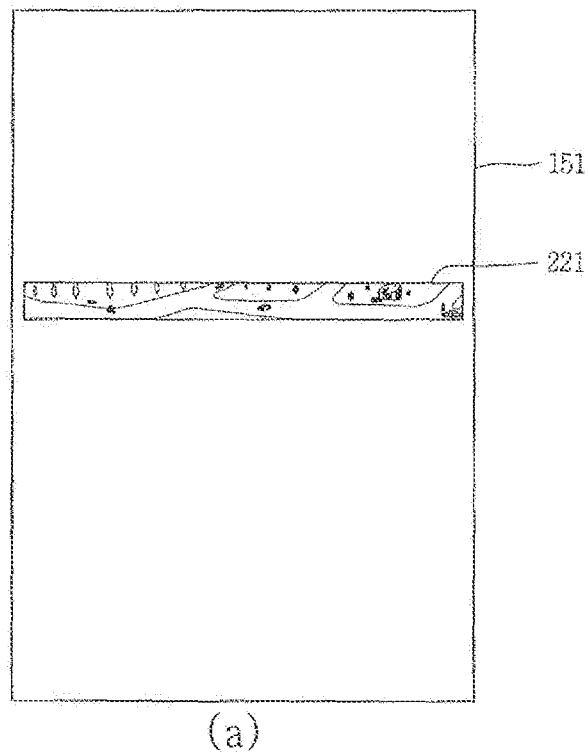
Figure 4B:
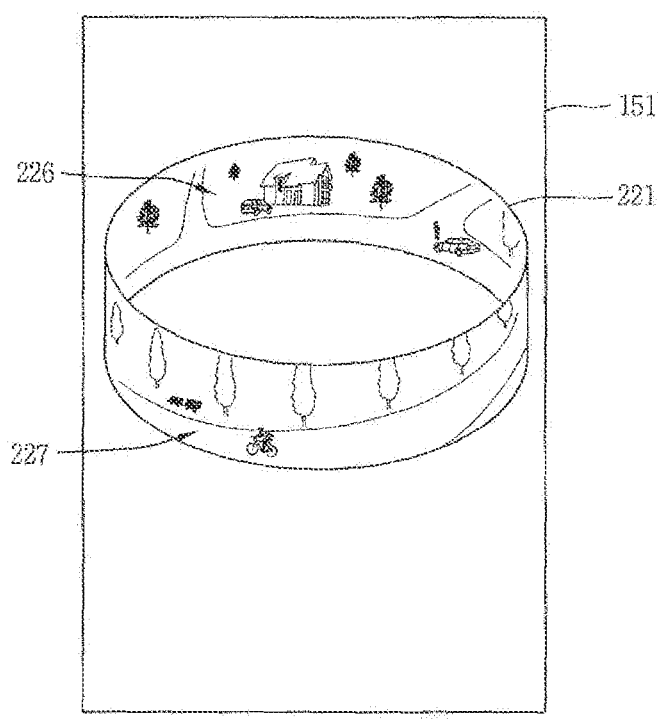

FIGS. 4a and 4b are illustrative views for explaining an advantage of an image display method associated with the present invention.

As described above, a panorama photo has a feature capable of providing a widely spread-out screen that cannot be obtained by a conventional camera. However, the feature may be an advantage when the panorama photo is printed on a paper but the feature may be also a disadvantage when it is displayed on a fixed-sized screen.

In other words, as illustrated in FIG. 4a, for a normal photo 211, the width-to-height ratio is substantially similar to a screen aspect ratio and thus it may be displayed on an entire screen. However, for a panorama photo 221, the width-to-height ratio is greatly different from a screen aspect ratio and thus it may be difficult to see the photo, because the size thereof becomes smaller to display the panorama photo as a whole on the screen.

For example, assuming that a panorama photo having a long horizontal length is displayed on a screen, the horizontal length 222 of the panorama photo should be adjusted to a width 223 of the screen and displayed like a flat sticker shape 224 to display the panorama photo 221 as a whole on the screen while maintaining the same width-to-height ratio. Accordingly, a vertical length of the panorama photo 221 is necessarily required to be reduced to be displayed. In other words, since a width of the screen is fixed, the larger the horizontal length of the panorama photo, the smaller the vertical length thereof, and thus the photo is reduced to be displayed. On the contrary, the smaller the horizontal length thereof, the larger the vertical length thereof, and thus the photo is enlarged to be displayed.

As a result, according to the present invention, there is provided a method of displaying the panorama photo as a whole while the horizontal length thereof being reduced, thereby resulting in displaying the panorama photo as enlarged as possible. In other words, as illustrated in FIG. 4b, when the panorama photo 221 is displayed in a particular object shape (for example, circular band) (see FIG. 4b) the vertical length is elongated compared to when displayed in a sticker shape on the same-sized display unit 151 (see FIG. 4a), and thus it may be possible to display a more enlarged photo.

As described above, according to the present invention, a panorama photo is changed into a particular object shape (for example, circular band, polygonal band, cylindrical, spherical, spiral, or wave-shaped band). When a panorama photo is changed into a particular object shape in this manner, one side length (for example, horizontal length) of the panorama photo is reduced by at least a particular ratio (for example, 1/2), and accordingly, it may be possible to increase a vertical length of the image being displayed as an object shape. In other words, the panorama photo is more enlarged to be displayed.

When a panorama photo is displayed in an object shape in which both outer and inner sides (or front and rear surfaces) thereof are simultaneously viewed like a circular band 225 as described above, the controller 180 can reverse an image that is seen from the inner side 226 or outer side 227 to display the reversed image. In other words, the image display direction may be switched and displayed to a direction that can be conveniently seen by the user.

In this manner, according to the present invention, there is provided an effect of allowing the user to view a more enlarged panorama photo than a conventional panorama photo that has been displayed in a flat sticker shape, as well as to view the panorama photo in three-dimension.

Figure 5:
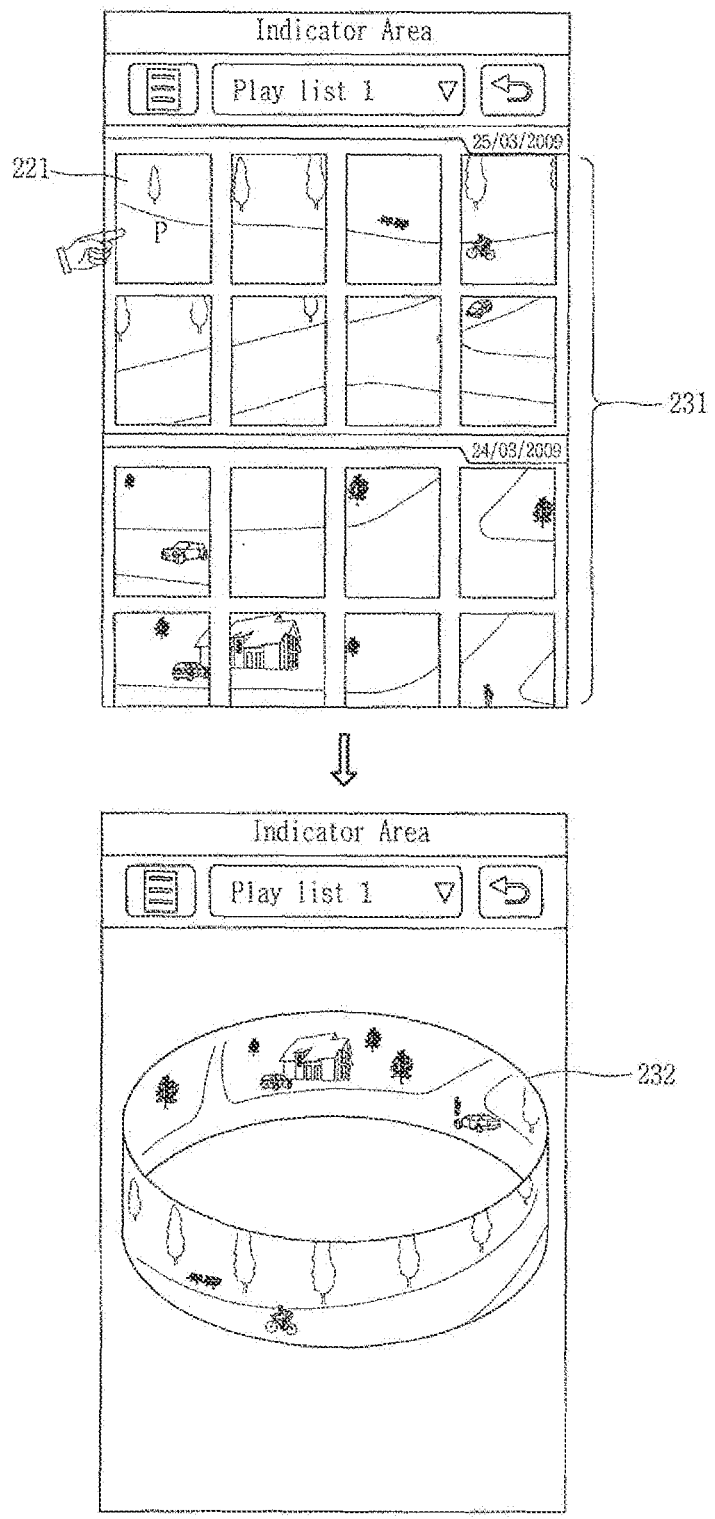
FIG. 5 is an illustrative view for explaining a method of displaying a panorama photo selected in a mobile terminal associated with the present invention.

FIG. 5 is an illustrative view for explaining a method of displaying a panorama photo selected in a mobile terminal associated with the present invention.

When a photo album menu is implemented by the user, the controller 180 displays a photo list 231. The photo list may be displayed with a preview form or file names. Moreover, the information (not shown) for determining whether it is a normal or panorama photo may be additionally displayed, and the normal and panorama photos are classified to be displayed in different regions (not shown).

The user may select his or her desired photo from the photo list to display on an entire screen, and at this time, it may be displayed in a particular preset object shape 232 when the selected photo is a panorama photo. In other words, the panorama photo is displayed as a plane such as sticker in the related art while the panorama photo is displayed as a three-dimensional object shape in the present invention.

Figure 6:
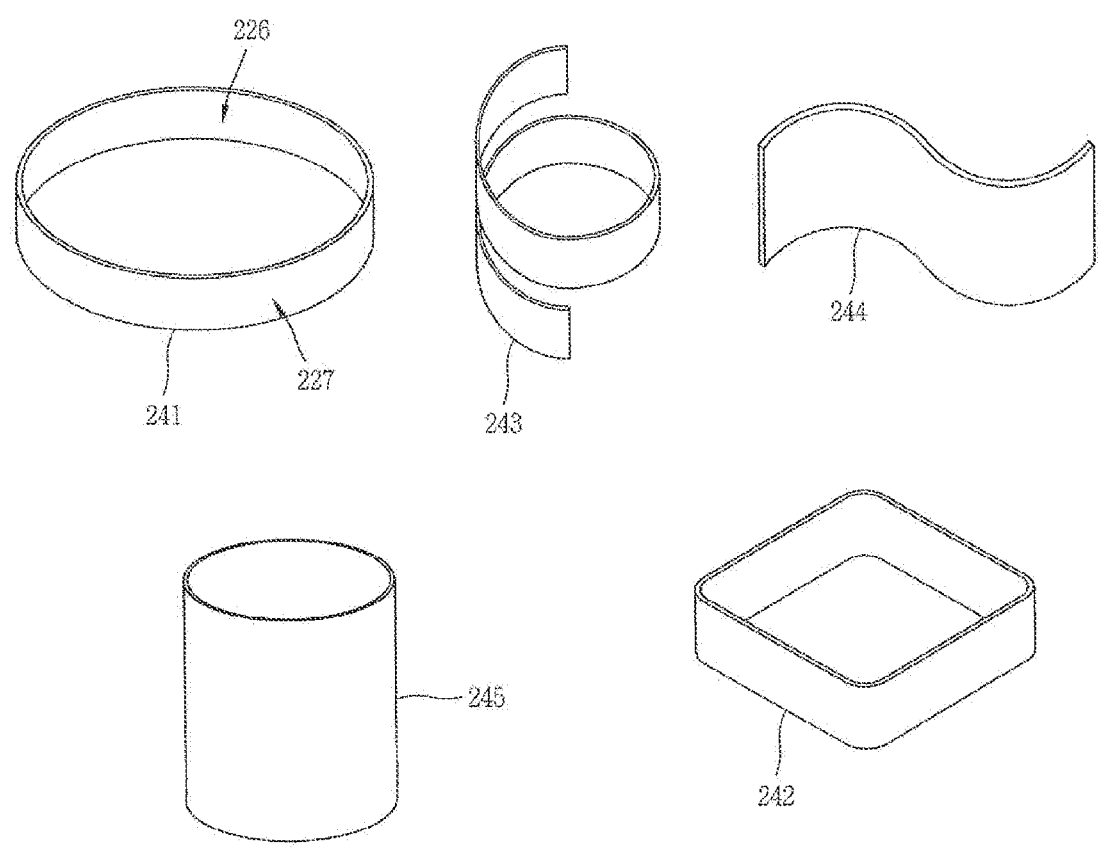
FIG. 6 is an illustrative view illustrating objects displayed with a panorama photo in a mobile terminal associated with the present invention.

FIG. 6 is an illustrative view illustrating objects displayed with a panorama photo in a mobile terminal associated with the present invention.

The objects may be constructed in the shape of a band that can be easily seen by the user in which an entire image can be displayed at the outer and inner sides (or front and rear surfaces) of the object even if the shape of the objects is folded, turned over, rotated, or moved.

For example, the band shape may be constructed with a band having a curved shape such as a circular band shape 241 with no edge, a polygonal band shape 242 with edges, a spiral shape 243, or a sine wave shape 244 (for example, wave-shaped band). The foregoing three-dimensional shapes allow the user to use a screen size to the maximum extent, thereby displaying a more enlarged photo.

At this time, the height (or depth) of the object can be varied according to the length of the panorama photo. For example, the object may be changed from a circular band shape to a cylindrical shape 245 if the height (or depth) of the object is increased.

On the other hand, when a panorama photo is three-dimensionally displayed as described above, an image displayed at the front surface thereof will be easily seen to the user while an image displayed on the rear surface thereof will be hided by the front surface image not to be easily seen to the user. In particular, when the height of the object is long such as a cylindrical shape, the rear surface image will be hided by the front surface image not to be easily seen because a portion being overlapped with the front and rear surface images is increased.

As a result, according to the present invention, a panorama photo displayed in three dimension can be rotated in a particular direction (for example, upward, downward, left, and right). The rotation direction may be indicated by the user or automatically indicated according to a particular preset condition. Furthermore, when rotating the panorama photo, the rotation speed may be indicated by the user or automatically indicated according to a particular preset condition.

Figure 7:
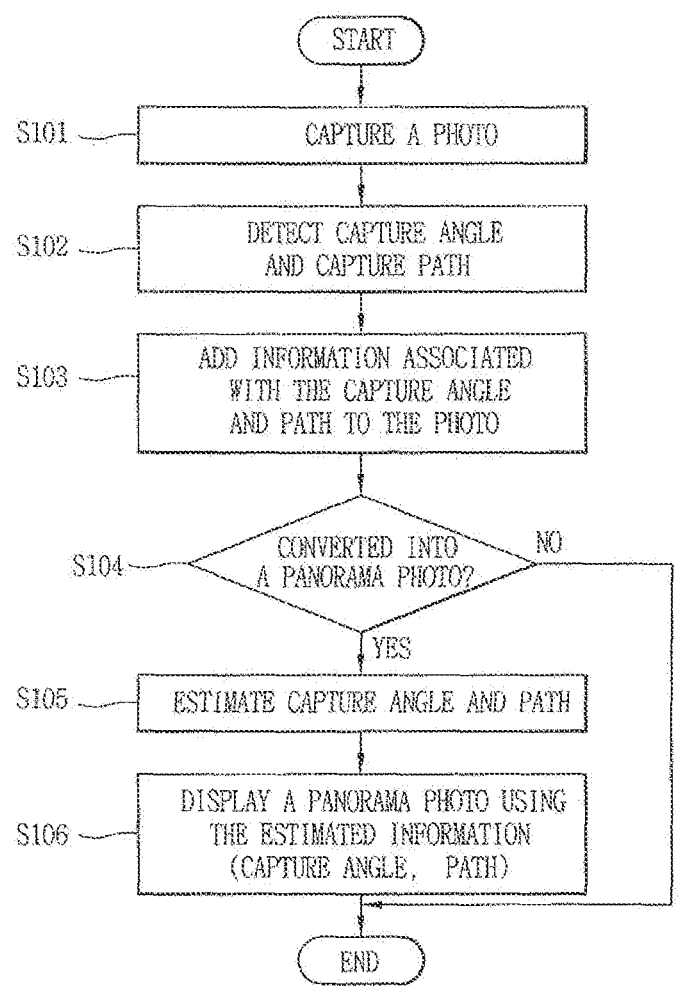
FIG. 7 is an illustrative view for explaining a method of displaying a panorama photo in such a manner that the photo is captured by the user according to the present invention.

FIG. 7 is an illustrative view for explaining a method of displaying a panorama photo in such a manner that the photo is captured by the user according to the present invention.

The manner that the photo is captured by the user is a manner in which a capture angle of the camera when the photo is captured by the user, and a moving direction or flow while being continuously captured are considered. According to the present invention, a panorama image may be constructed to be displayed with the same angle or path (for example, the orientation to which the camera faces when captured) as the manner that the photo is captured by the user.

In other words, if capturing a photo is started by the user (S101), then the controller 180 detects a capture angle and a capture path (S102). Then, the information associated with the capture angle or path is added to the photo (S103). The capturing a photo is continuously carried out, and if the capturing is completed and then converted into a panorama photo (an example of S104), then the controller 180 estimates the information (for example, capture angle, capture path, image-overlapped region) added to the photo (S105), and displays a panorama photo using the information (S106).

For example, when images are continuously captured by the user while moving a camera of the mobile terminal in a wave shape, the controller 180 can display a panorama photo in the wave shape using the continuously captured photos. Furthermore, when images are continuously captured by the user while moving a capture path in an oblique line, the controller 180 can display a panorama photo in the oblique line direction using the continuously captured photos.

Accordingly, in addition to the aforementioned shapes, various shapes of panorama photos can be captured according to the user's capture method. Here, the user's capture path can be estimated by using an overlapped portion on the continuously captured photos, but an orientation detection sensor (not shown) and a tilt sensor (not shown) are provided and their sensed information may be additionally used to trace a more accurate path.

As described above, according to this embodiment, a panorama photo may be displayed in a desired shape using the user's capture method.

Figure 8A:
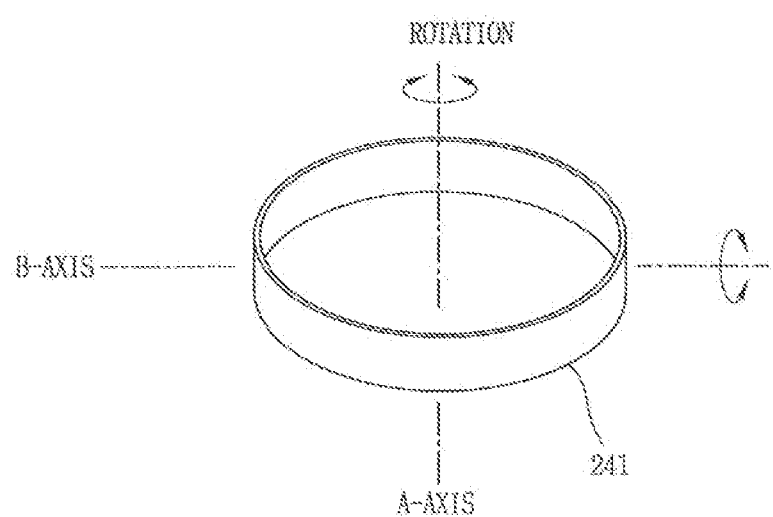
FIGS. 8a through 8c are illustrative views for explaining a method of rotating an image displayed on a mobile terminal associated with the present invention according to a particular condition.
Figure 8B:
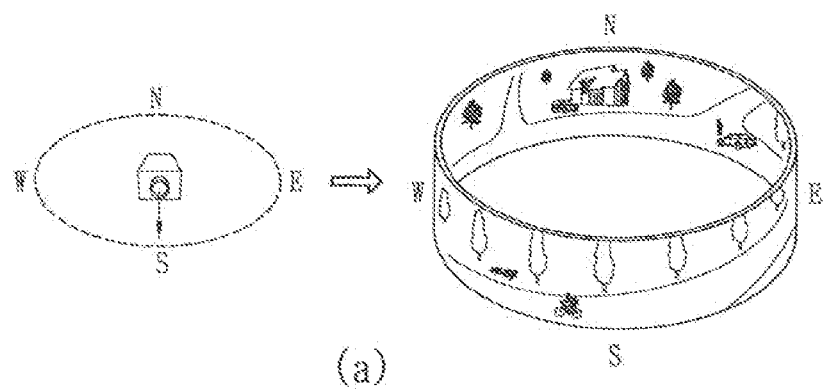
Figure 8C:
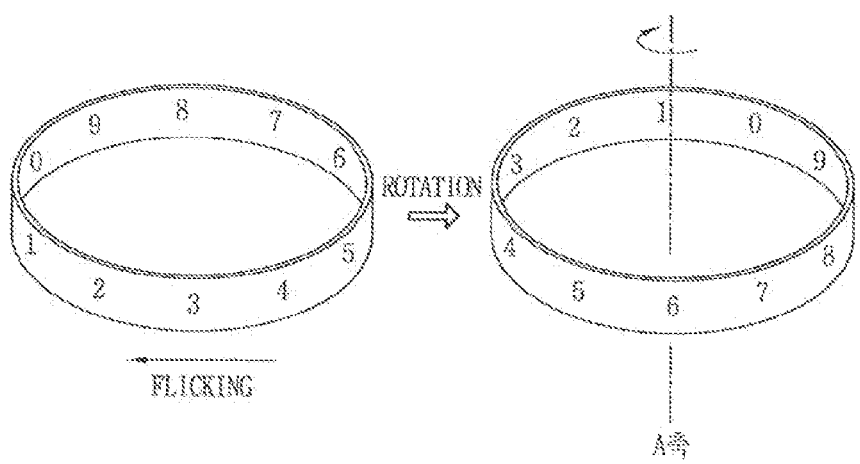

FIGS. 8a through 8c are illustrative views for explaining a method of rotating an image displayed on a mobile terminal associated with the present invention according to a particular condition.

As illustrated in FIG. 8a, it is assumed that any image (for example, panorama photo) is displayed in a particular object shape (for example, band shape) 241 on the display unit 151. Accordingly, the controller 180 checks time to automatically rotate the image with a particular time interval. The direction for rotating the image may be clockwise or counter clockwise around the A-axis. Otherwise, it may be rotated in an upward or downward direction around the B-axis. As described above, the image can be rotated, thereby allowing the user to see the image on the front or rear surfaces of the particular object.

Furthermore, as illustrated in FIG. 8*b*, the controller 180 can detect a direction (or orientation) faced by a particular surface of the mobile terminal (for example, a surface faced by the camera, or a surface faced by the display), thereby rotating the image to correspond to the direction.

For example, as illustrated in FIG. 8*b* (*a*), if a particular surface of the mobile terminal faces the south (S), then the controller 180 rotates the image to coincide a portion corresponding to the south with the direction faced by the particular surface. Furthermore, as illustrated in FIG. 8*b* (*a*), if a particular surface of the mobile terminal faces the north (N), then the controller 180 rotates the image to coincide a portion corresponding to the north with the direction faced by the particular surface.

Here, the image may correspond to every direction (for example, 360°). Accordingly, an image can be rotated to correspond to every direction that is faced by the mobile terminal. As a result, if the direction that is faced by the mobile terminal is continuously changed, then the image may be also continuously rotated to correspond to the changed direction.

Furthermore, as illustrated in FIG. 8*c*, the controller 180 can detect the user's touch and flicking to rotate the image in the flicking direction. For example, when the user touches the image and then flicks to one side direction (for example, upward, downward, left, and right), the controller 180 can rotate fast or slowly at a particular speed (for example, flicked speed) to correspond to the flicked direction. In other words, it may be rotated fast if the flicking speed is fast, and it may be rotated slowly if the flicking speed is slow. On the other hand, in the above embodiment, the rotation direction is not only limited to the left or right, but may be also rotated in a upward or downward direction.

Figure 9A:
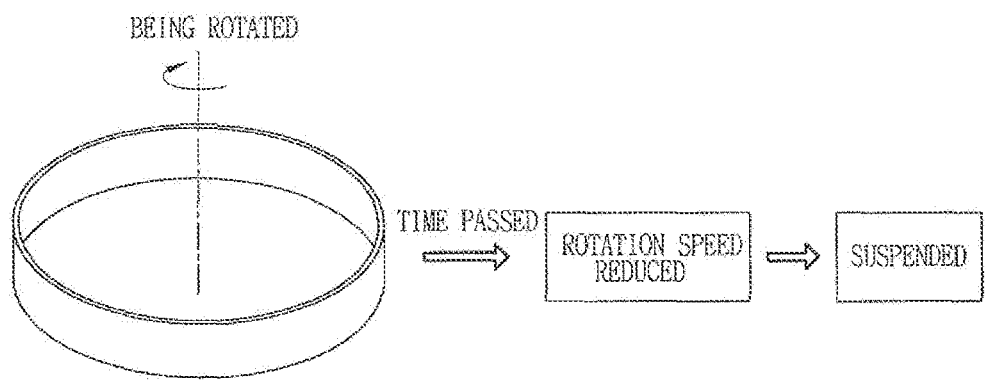
FIGS. 9a through 9c are illustrative views for explaining a method of suspending an image to be rotated on a mobile terminal associated with the present invention according to a particular condition.
Figure 9B:
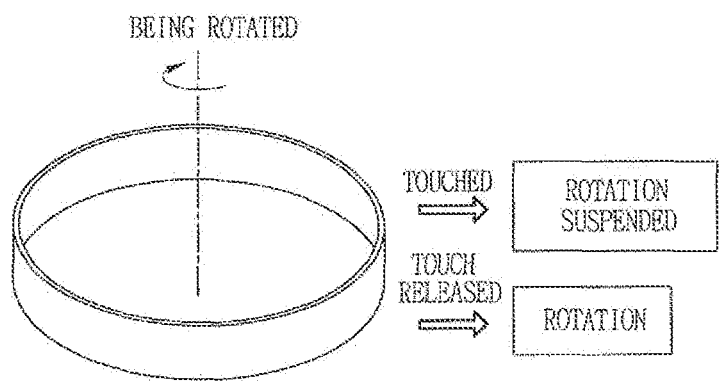
Figure 9C:
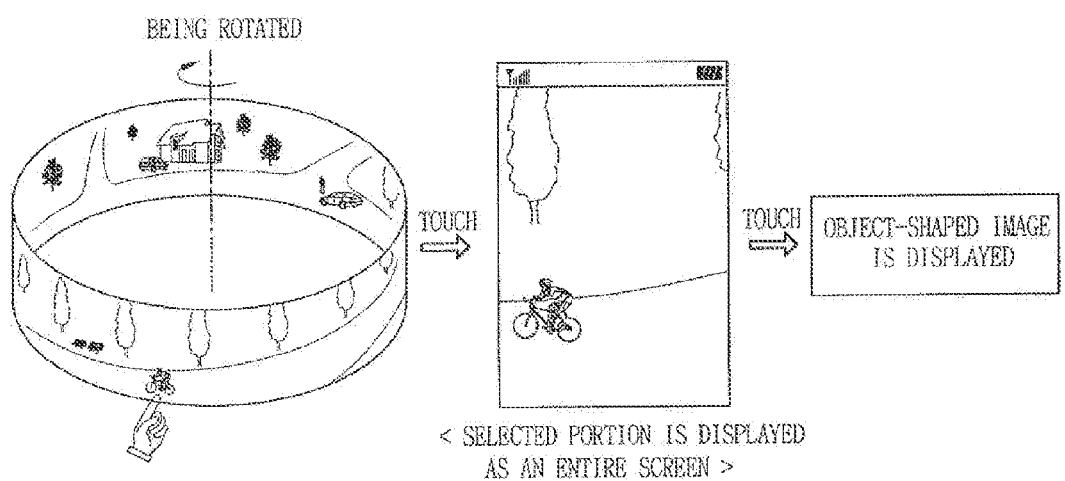

FIGS. 9*a* through 9*c* are illustrative views for explaining a method of suspending an image to be rotated on a mobile terminal associated with the present invention according to a particular condition.

As described above, according to the present invention, an image may be three-dimensionally displayed by using a particular object shape, and also an object being displayed with the image may be rotated in a particular direction. The foregoing image to be rotated may be automatically or manually suspended.

For example, when an image displayed with an object shape is manually rotated by the user's flicking as described above, as illustrated in FIG. 9*a*, the controller 180 can strongly rotate the image being displayed with an object shape at first, and then decrease the rotation speed to a predetermined speed as time passes, and then automatically suspend the rotation at last.

Furthermore, as illustrated in FIG. 9*b*, when an image displayed with an object shape is automatically rotated, if the user touches any position of the image or screen while the user's desired portion is displayed on the image being rotated, then the controller 180 will suspend the rotation of the image. In addition, if any position of the image or screen is touched once more, or the touch is released, then the controller 180 will rotate the suspended image again. Furthermore, if the user drags the image in a particular direction in a state that the rotation of the image is suspended, namely, touched, then the controller 180 can rotate or move the object by a particular angle at his or her discretion.

Furthermore, as illustrated in FIG. 9*c*, if a desired portion is long-touched or double-touched on the image by the user, then the controller 180 will display an image around the touched portion on an entire screen. Furthermore, if any portion of the image displayed on the entire screen is touched, long-touched, or double-touched, then the image displayed on the entire screen will be displayed again as the original object shape.

Figure 10A:
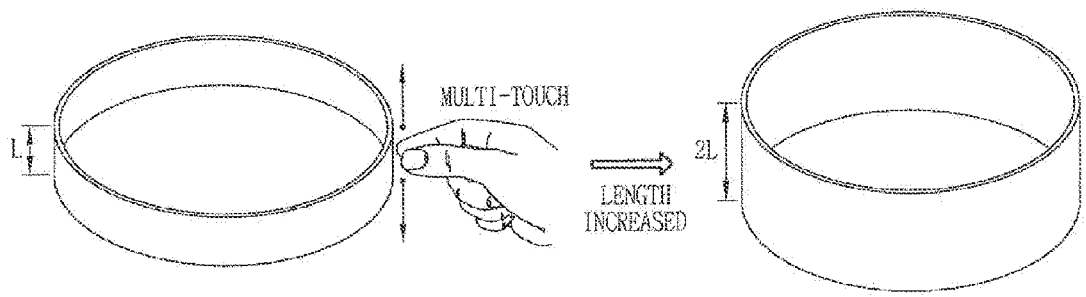
FIGS. 10a and 10b are illustrative views for explaining a method of changing the shape of an image displayed on a mobile terminal associated with the present invention.
Figure 10B:
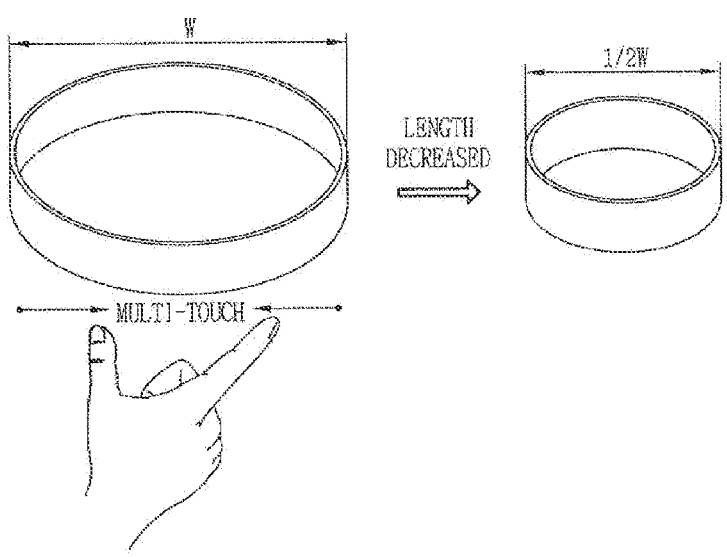

FIGS. 10*a* and 10*b* are illustrative views for explaining a method of changing the shape of an image displayed on a mobile terminal associated with the present invention.

As described above, it is assumed that any image (for example, panorama photo) is displayed in a particular object shape (for example, band shape) on the display unit 151. Furthermore, the controller 180 can detect a multi-touch being inputted on the display unit 151.

The user can change an area or size of the object by inputting a multi-touch.

For example, as illustrated in FIG. 10*a*, if two positions (for example, top and bottom sides) are multi-touched in one side (for example, left or right side) of the object displayed with the image, and then an interval of the multi-touch is widened, then the controller 180 widens the top/bottom side length of the object (for example, L→2L). On the contrary, in case of narrowing an interval of the multi-touch, the top/bottom side length of the object will be reduced. At this time, two positions may be a point that is brought in contact with the image or located within a particular predetermined distance from the image.

Furthermore, as illustrated in FIG. 10*b*, if two positions (for example, left right sides) are multi-touched in another one side (for example, top or bottom side) of the object, and then an interval of the multi-touch is narrowed, then the controller 180 narrows the left/right side length of the object (for example, W→½W). On the contrary, in case of widening an interval of the multi-touch, the left/right side length of the object will be increased. In other words, an area or size of the image displayed with an object shape will be enlarged or reduced.

Figure 11:
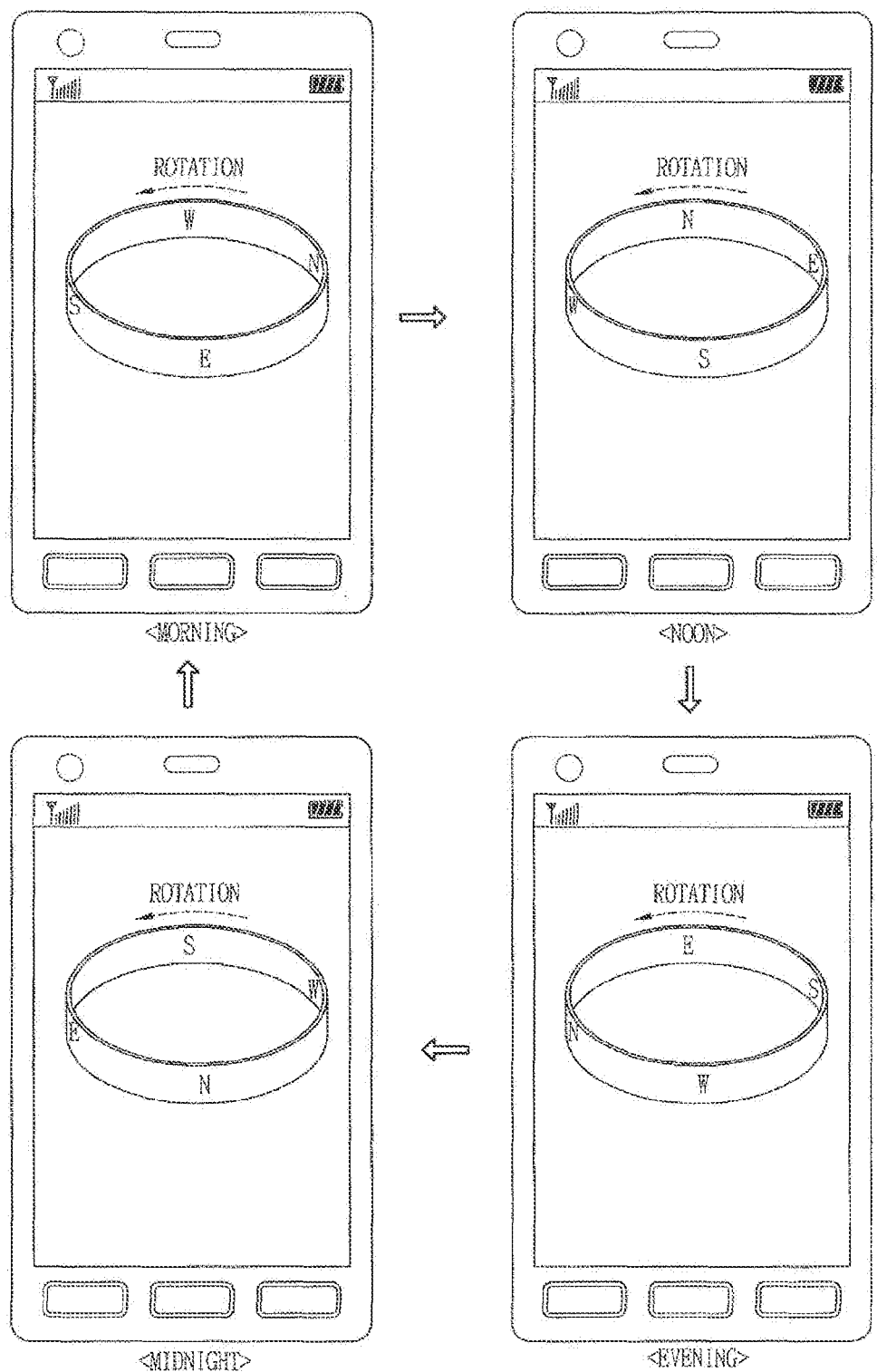
FIG. 11 is an illustrative view for explaining a method of setting an image displayed with a particular object shape to a standby screen according to the present invention.

FIG. 11 is an illustrative view for explaining a method of setting an image displayed with a particular object shape to a standby screen according to the present invention.

According to the present invention, as described above, an image selected from a photo album is displayed in a particular object shape, and then the image that has been displayed in the particular object shape may be set to a standby screen. Here, it is assumed that the image is a panorama photo in which a surrounding scene is captured by rotating 360°.

Even if an image displayed in a particular object shape is set to a standby screen as described above, the options set for the image may be maintained as it is. Assuming that a rotation option is set for the image, the image will be rotated in the previously indicated direction at a predetermined speed even subsequent to being set to a standby screen.

For example, assuming that the image is allowed to correspond to the rotation speed and direction of the earth, the controller 180 rotates the image such that a portion corresponding to the east (E) of the image is displayed at a front surface thereof at a particular time in the morning, and gradually rotates the image such that a portion corresponding to the south (S) of the image is displayed at the front surface thereof at a particular time at noon, and gradually rotates the image such that a portion corresponding to the west (W) of the image is displayed at the front surface thereof at a particular time in the evening, and gradually rotates the image such that a portion corresponding to the north (N) of the image is displayed at the front surface thereof at a particular time at midnight.

According to this embodiment, an image set to a standby screen as described above may be rotated to correspond to time. The image may include orientation information for rotating the image to correspond to the rotation direction or speed (=time) of the earth as described above.

Figure 12A:
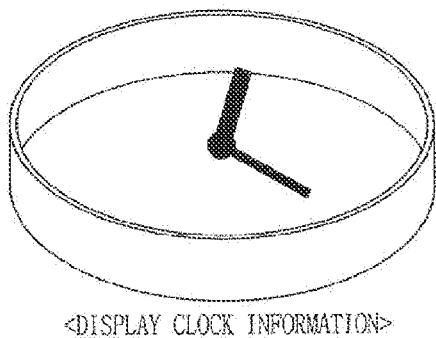
FIGS. 12a through 12c are illustrative views for explaining a method of additionally displaying supplementary information on an image displayed with a particular object shape according to the present invention.
Figure 12B:
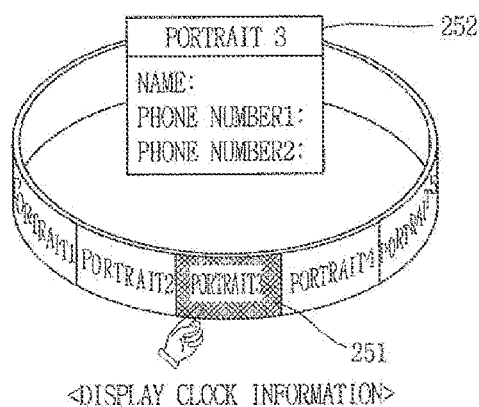
Figure 12C:
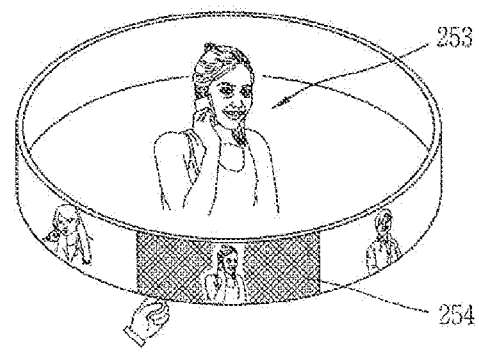

FIGS. 12a through 12c are illustrative views for explaining a method of additionally displaying supplementary information on an image displayed with a particular object shape according to the present invention.

According to this embodiment, a photo that has been previously captured in a panorama form (panorama type) can be displayed in a particular object shape, and a photo in which a plurality of normal photos have been sequentially connected and converted into a panorama form can be also displayed in a particular object shape. For the sake of convenience, it is assumed that the object shape is a circular band shape in which the inside is vacant.

As illustrated in FIG. 12a, the controller 180 may display supplementary information (for example, clock, orientation information, portrait information) within the object (for example, circular band) according to the preset option. Furthermore, the supplementary information may be overlapped with the object to be displayed. Furthermore, any image of the supplementary information may be added to any one side of outer sides (for example, top, bottom, left, and right) of the object to be displayed.

On the other hand, assuming that the panorama photo is a photo that is made by connecting portrait photos registered in a phone book, as illustrated in FIG. 12b, the controller 180 can display supplementary information (for example, enlarged portrait image, or information registered in a phone book of the portrait) 252 associated with a particular portrait (for example, a portrait displayed at a front surface among the portraits included in the rotating circular band) 251 within the object from the supplementary information. Accordingly, if a portrait displayed at the front surface thereof is changed according to the rotation of the object, then the information being displayed at the inside thereof will be immediately changed.

For another embodiment, as illustrated in FIG. 12c, assuming that a multiplexed video phone conversation is performed by the user, the controller 180 can connect callers participating in the multiplexed video phone conversation to one another, and thus they are displayed in a circular band shape. Furthermore, the controller 180 can display any one 253 of the callers in an enlarged image 254 within the object (for example, circular band). Here, any one of the callers may be a caller who is currently speaking or the user himself or herself.

Here, the controller 180 may display the supplementary information using an on-screen display (OSD) method, or display the supplementary information to be overlapped on an image displayed in the particular object shape using an overlay method.

Figure 13:
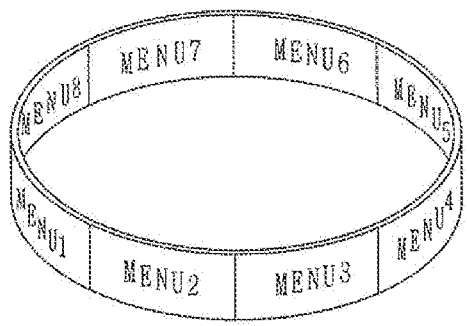
FIG. 13 is an illustrative view for explaining a method of displaying user menus with a particular object shape according to the present invention.

FIG. 13 is an illustrative view for explaining a method of displaying user menus with a particular object shape according to the present invention.

Typically, mobile terminals have a menu (for example, user menu) in which the menus primarily used by the user are separately collected. According to this embodiment, when the mobile terminal have user menus as described above, the controller 180 sequentially connects the menus to convert into a panorama form, and then displays them in a particular object shape (for example, circular band).

For the sake of convenience, it is assumed that the object shape is a circular band shape.

The user menus provided in a particular object shape as described above may be rotated at a particular speed in a particular direction similarly to the foregoing image. In other words, consecutively connected user menus are sequentially rotated. At this time, the menus displayed at a rear surface thereof may be displayed in an reversed form, or may be displayed in a non-reversed form.

As described above, preferred embodiments of the present invention have been described with reference to the accompanying drawings.

Here, the terms and words used herein and the claims should not be construed by limiting to their typical or lexical meaning, but should be construed based on the meaning and concept conforming to the technical spirit of the present invention.

Accordingly, the configuration illustrated in the embodiments disclosed herein and the drawings is merely the most preferred embodiment of the present invention, and is not intended to represent all the technical spirit of the present invention, and thereby it should be appreciated that there may exist various equivalents and modifications for substituting those at the time of filing this application.

What is claimed is:

1. A method of controlling a mobile terminal, the method comprising:
   displaying an image list;
   receiving an input selecting a particular image from the image list;
   converting an entire panorama of the selected image into a preset three-dimensional curved shape when the selected image is a panorama-type image;
   displaying an image comprising the preset three-dimensional curved shape; and
   changing a size or length of the preset three-dimensional curved shape in response to detecting at least one multi-touching input on the preset three-dimensional curved shape,
   wherein the preset three-dimensional curved shape comprises a circular band, polygonal band, spiral shape, sine wave, spherical shape, or cylindrical shape.

2. The method of claim 1, further comprising:
   detecting whether an option associated with the display of the image is set;
   detecting whether a condition corresponding to the option is satisfied if the option associated with the display of the image is set; and
   applying the option to the preset three-dimensional curved shape if the condition corresponding to the set option is satisfied.

3. The method of claim 1, further comprising continuously displaying the selected particular image on inner and outer sides of the preset three-dimensional curved shape.

4. The method of claim 2, wherein the option comprises an option for rotating the image comprising the preset three-dimensional curved shape in a particular direction.

5. The method of claim 4, wherein the option for rotating the image comprises an option for rotating the image comprising the preset three-dimensional curved shape at a particular time interval.

6. The method of claim 4, wherein the option for rotating the image further comprises an option for rotating an image comprising a portion captured in a particular direction to which the mobile terminal faces to be oriented in the particular direction.

7. The method of claim 4, wherein the option for rotating the image further comprises an option for detecting a user's touch and flicking to rotate the image in the flicking direction.

8. The method of claim 4, further comprising:
rotating the preset three-dimensional curved shape if the condition corresponding to the set option is satisfied;
suspending the rotation if a user's touch input is detected; and
re-starting the rotation according to the set option if the user's touch input is released.

9. The method of claim 1, further comprising:
widening a length of one side of the preset three-dimensional curved shape when the at least one multi-touching input is detected on one side of the object and a spacing of the at least one multi-touching input is widened; and
narrowing the length of the one side of the preset three-dimensional curved shape when the at least one multi-touching input is detected on the one side of the object the spacing of the at least one multi-touching input is narrowed.

10. The method of claim 2, wherein the option comprises an option to display preset supplementary information overlapped on an inner side or an outer side of the image comprising the preset three-dimensional curved shape.

11. The method of claim 10, wherein the present supplementary information comprises at least clock information, orientation information, phone conversation information, videophone conversation information, portrait information, phone book information, or a graphic image.

12. A mobile terminal, comprising:
a display unit;
a touch pad configured to receive an input selecting an image displayed on the display unit; and
a controller configured to:
determine a type of the selected image;
convert an entire panorama of the selected image into a preset three-dimensional curved shape and display the image comprising the preset three-dimensional curved shape when the image is a panorama-type image; and
change a size or length of the preset three-dimensional curved shape in response to detecting at least one multi-touching input on the preset three-dimensional curved shape,
wherein the preset three-dimensional curved shape comprises a circular band, polygonal band, spiral shape, sine wave, spherical shape, or cylindrical shape.

13. The mobile terminal of claim 12, wherein the controller is further configured to apply an option associated with the display of the image to the preset three-dimensional curved shape when the option is set and a condition corresponding to the option is satisfied.

14. The mobile terminal of claim 13, wherein the controller is further configured to rotate the image comprising the preset three-dimensional curved shape in a particular direction according to the set option.

15. The mobile terminal of claim 14, wherein the controller is further configured to rotate the image comprising the preset three-dimensional curved shape at a particular time interval according to the set option.

16. The mobile terminal of claim 14, wherein the controller is further configured to rotate an image comprising a portion captured in a particular direction to which the mobile terminal faces such that the image is oriented in the particular direction according to the set option.

17. The mobile terminal of claim 14, wherein the controller is further configured to detect a user's touch and flicking to rotate the image in the flicking direction according to the set option.

18. The mobile terminal of claim 13, wherein the controller is further configured to display preset supplementary information overlapped on an inner side or an outer side of the image comprising the preset three-dimensional curved shape according to the set option.

* * * * *